United States Patent Office 3,462,236
Patented Aug. 19, 1969

3,462,236
PROCESS FOR DYEING, PADDING OR PRINTING
Donald Keighley Clough, Bolton, Bradford, England, assignor to Sandoz Ltd. (also known as Sandoz A.G.), Basel, Switzerland
No Drawing. Filed Mar. 21, 1966, Ser. No. 535,713
Claims priority, application Switzerland, Mar. 26, 1965, 4,253/65
Int. Cl. C09b 67/00; D06p 1/68
U.S. Cl. 8—54    5 Claims

ABSTRACT OF THE DISCLOSURE

Polyamide fibers are treated, prior to or during dyeing, with at most 4 percent by weight (based on the weight of the treating bath) of a carboxylic acid of restricted solubility in water. The dyeings can be effected and/or developed at temperatures of at most 100° C.

---

The present invention relates to a process for dyeing, padding or printing polyamide fibers, wherein the fibers are treated before or during the dyeing, padding or printing with a small quantity of a compound of the formula

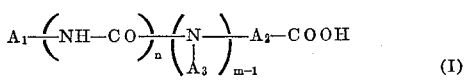

wherein $A_1$ represents a hydrocarbon residue which contains 4 to 22 carbon atoms, and may be interrupted in the carbon chain by hetero atoms and may contain further substituents, $A_2$ represents a divalent hydrocarbon residue which may contain hetero atoms, preferably oxygen or sulfur, and/or substituents, $A_3$ represents a hydrogen atom or a possibly substituted lower alkyl radical, and $n$ and $m$ each represents 1 or 2.

For the purpose of defining what is meant by a small quantity, we may set an upper limit of 4% by weight of the compound in the dyebath. In this specification and claims the expression dyeing, when used in a general sense, is to be taken as including padding and printing and the expression dyebath is intended to include padding liquor or printing paste. The optimum quantity will normally be at least 0.25 part by weight per 1000 parts of dyebath, particularly from 0.5 to 5 parts and especially from 0.5 to 2 parts in exhaustion dyeing and from 5 to 40 parts and especially from 10 to 20 parts in padding and printing.

Suitable polyamides are both natural polyamidic fibers, such as silk, hairs and especially wool, and synthetic polyamides, such as the condensation products of hexamethylenediamine with adipic acid (nylon 66) or sebacic acid (nylon 610), from ε-caprolactam (nylon 6) or from ω-aminoundecanoic acid (nylon 11) or from hexamethylenediamine, adipic acid and ε-caprolactam (nylon 66/6). The polyamide fibers may be used at any stage of their processing, thus, for example, in the form of filaments, yarns, woven or knitted fabrics, and wool, hairs and silk also in the loose form.

The process is also suitable for mixtures of fibers, especially of wool and synthetic polyamide fibers or for the polyamide portion of mixtures of fibers or of mixed fabrics.

The residue $A_1$ in the Formula I is preferably a branched or linear, if desired substituted, alkyl or alkenyl radical containing 6 to 18, preferably 8 to 12, carbon atoms or an alkyl-Y-alkylene radical containing in all 6 to 18, preferably 8 to 12, carbon atoms (where Y stands for —O—, —S— or —CO—NH—), such as n-hexyl, n-heptyl, oxo-tridecyl, n-tetradecyl, n-hexadecyl, n-octadecyl, Δ9-n-octadecenyl (oleyl), 12-hydroxy-n-octadecyl or especially n-dodecyl, n-decyl, oxo-decyl, oxo-nonyl, n-octyl and 2-ethyl-n-hexyl; furthermore n-octyloxy-trimethylene or 2-ethyl-n-hexyloxy-trimethylene. (The word "oxo" signifies that the alkyl radical concerned stems from an alcohol prepared by the oxo-process addition of carbon monoxide onto an olefine followed by reduction.) The residue $A_1$ may also be a cycloalkyl (cyclohexyl or methylcyclohexyl) group, an aralkyl (benzyl or phenylethyl) group, an aryl group (phenyl or alkylphenyl radical whose alkyl residue may contain about 1 to 8 carbon atoms, a dialkylphenyl radical containing a total of 2 to 10 carbon atoms in the two alkyl residues which may be identical or different from each other; fluorophenyl, chlorophenyl, bromophenyl, alkoxyphenyl whose alkoxy residue may contain 1 to 8 carbon atoms, or a naphthyl-1 or naphthyl-2 residue).

The residue $A_2$ is preferably a divalent, possibly substituted, saturated or unsaturated aliphatic radical containing 1 to 6 carbon atoms e.g. —$CH_2$—, —$CH_2$—$CH_2$—, —$(CH_2)_x$—, where $x=3$ to 6, —CH—, —CH=CH—, —CH—$CH_2$—, —$CH_2$—CH—
  |                        |                 |
  $CH_3$                   $CH_3$            $CH_3$ —CH—$CH_2$—$CH_2$—, —$CH_2$—CH—$CH_2$—
  |                              |
  $CH_3$                         $CH_3$ or a possibly substituted phenylene group, e.g. 1,2-, 1,3- or 1,4-phenylene, 3- or 4-chloro-1,2-phenylene or a radical, such as —$CH_2$—O—$CH_2$—, or —$CH_2$—S—$CH_2$—.

When the residue $A_3$ represents a possibly substituted alkyl radical, it contains advantageously 1 to 5 carbon atoms (being a methyl, ethyl, n-propyl, isopropyl, n-butyl, isobutyl, isoamyl or n-amyl group) and may be substituted (being 2-hydroxyethyl, 2- or 3-hydroxypropyl, 2-ethoxyethyl, 3-methoxypropyl; also benzyl or phenylethyl).

Suitable compounds of the Formula I are, e.g.

n-octyl-NH—OC—CH=CH—COOH, M.P.=60° C. (uncor.)

2-ethyl-n-hexyl—O—$CH_2$—$CH_2$—$CH_2$—NH—OC —CH=CH—COOH, M.P.<0° C.

n-octyl—NH—CO—NH—OC—CH=CH—COOH

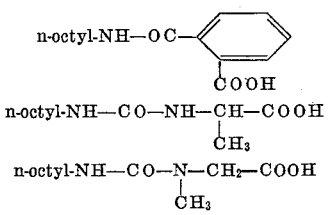

n-octyl-NH—CO—NH—CH—COOH
                      |
                      $CH_3$ n-octyl-NH—CO—N—$CH_2$—COOH
                  |
                  $CH_3$ It is advantageous if the compounds of the Formula I, in the form of their free acids, melt at temperature below 100° C., preferably below about 70° C. Preferred use is made of those compounds of the Formula I which melt at room temperature or at a little higher temperature, e.g. up to about 30° C. They should be only restrictedly soluble in water. Of readily soluble compounds too large a proportion would have to be used, whereas entirely insoluble compounds would be too inert.

The incorporation of one of the above-mentioned compounds with the dyebath, the padding liquor or the printing paste offers the considerable advantage that the polyamides, particularly wool, can be dyed at a temperature below 100° C. and sometimes more quickly, or that the prints or paddings can be developed at a temperature below 100° C.; for example when steaming, or when dyeing at 100° C., the developing or dyeing time can be reduced. In this manner the handle of the wool fiber is substantially improved and, at the same time, energy is saved. Moreover, it is only now possible to dye economically in a continuous manner because the steaming operation required in the known pad steam process takes too long.

It is possible, for example, to dye wool within one hour at 60 to 70° C. stronger tints than could be achieved by the conventional method or by dyeing in the presence of, for example, benzyl alcohol, or to develop wool dyeings at room temperature by the pad batch process in 4 to 6 hours, or to reduce the steaming time for prints or pad dyeings, which is of special importance because in all continuous wool dyeing methods the steaming operation constitutes a bottleneck.

Further advantages of the new compounds are that they make it possible:

(a) to dye stripy, synthetic polyamide fibers with 1:2-metal complex dyes at temperatures above 90° C. free from stripes and in a fast manner, (b) to dye mixed fabrics of wool and synthetic polyamide fibers in uniform, level and fast shades with 1:2-metal complex dyes or milling dyes, and (c) to dye wool and/or synthetic polyamide fibers in level and fast shades with mixtures of milling dyes.

Apart from the compound of the Formula I there may be added, especially to the padding liquors, an assistant capable of forming a coacerbate. Such assistants are, for example, the condensation products of fatty acids with diethanolamine or the adducts of ethylene oxide to compounds with an exchangeable hydrogen atom and a hydrophobic organic residue, preferably those adducts of this kind whose cloud point in the padding liquor does not exceed about 20 to 25° C. Such products have been described, e.g., in British specification 994,197.

The dyebath, padding liquors and printing pastes can contain further ingredients, e.g. levelling agents, such as alkyl-, alkenyl- or alkylphenylpolyglycol ethers, in which the hydrophobic residue contains preferably from 8 to 18, in the case of alkylphenyl 14 to 18, carbon atoms, or also mixtures of carboxymethylated polyglycol ethers with a hydrophobic residue of from 8 to 24 carbon atoms and high molecular eventually quaternated polyamines (see British Patent No. 808,647).

The dyeings, pad dyeings and prints obtained by the present process have considerable tinctorial strength and are level. The penetration of the dye in the interior of the fiber is better, as are the wet fastness properties compared with the conventional dyeing processes. Furthermore the new process is important for the dyeing of natural or synthetic polyamide fibers in continuous dyeing ranges in which the boiling point of the dyebath can not always be attained during the time which is at the dyer's disposal and for the dyeing of wool with reactive dyes at pH values above 6 and at temperatures below 90° C., whereby a damaging of the wool is avoided.

Parts and percentages in the following examples are by weight, and temperatures as shown in degrees centigrade.

EXAMPLE 1

A dyebath is prepared with 3000 parts of water, 2 parts of the dye of formula

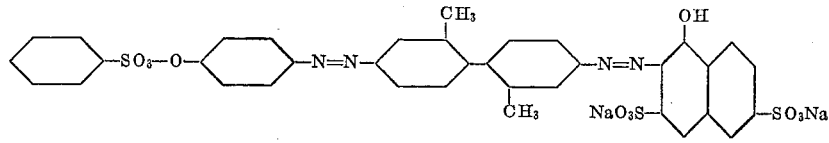

(C.I. Acid Red 111; 23,265), 2 parts of 100% acetic acid and 2 parts of the compound

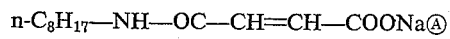

10 parts of wool are entered at 50° and treated for 10 minutes at this temperature, after which the bath is raised to 75° in 25 minutes and maintained at this temperature for a further 45 minutes. On completion of this time the bath is virtually exhausted and the scarlet dyeing has a fully developed shade and very good fastness. Without the addition of the assistant only a weak, skittery dyeing is obtained.

Very good results are likewise obtained when the dye used above is replaced by one of the following dyes:

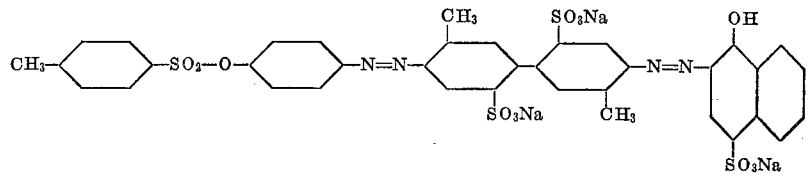

(C.I. Acid Red 145; 23,905, which has a yellowish red shade), 1,4-bis-(2',4',6'-trimethyl-3'-sulfophenylamino)-anthraquinone (blue), 6,7 - dichloro-1,4-bis-(2',4',6'-trimethyl-3'-sulfophenylamino) - anthraquinone (blue) and 1,4-bis-[4'-(4''-chlorophenyl) - 2 - sulfophenylamino]-anthraquinone (green) in the form of their sodium salts; the 1:2 chromium complex compound of 1-(2'-hydroxy-5'-methylsulfonyl - phenylazo)-2-hydroxy-8-acetylamino-naphthalene (bluish grey); the 1:2 chromium complex compound of 1-phenyl-3-methyl-4-(2''-hydroxy-3''-nitro-5''-chlorophenylazo)-5-pyrazolone-4'-sulfonic acid-methylamide (bluish red), the 1:2 chromium complex compound of 1-(2'-hydroxyphenylazo)-2-hydroxynapthalene-5'-sulfonic acid-(2''-hydroxyethylamide) (violet), the 1:2 cobalt complex compound of 1-(2'-hydroxyphenylazo)-2-hyddroxynaphthalene-5'-sulfonic acid - (2''-hydroxyethyl-amide) (bordeaux), the 1:2 heterogeneous chromium complex compound of 1-(2'-hydroxyphenylazo)-2-phenyl-aminonaphthalene - 5' - sulfonic acid-amide and 1-(3'-chlorophenyl)-3-methyl - 4 - (2'' - carboxyphenylazo)-5-pyrazolone-4''-sulfonic acid-methylamide (olive green).

EXAMPLE 2

A dyebath is set with 4000 parts of water, 5 parts of sodium 1-hydroxy-2-(2'-hydroxy-3',5',6'-trichlorophenyl-azo)-8-acetylaminonaphthalene-5-sulfonate, 2 parts of sodium chromate, 4 parts of ammonium sulfate, 1 part of 100% acetic acid and 2 parts of the compound 2-ethyl-n-hexyl—O—CH$_2$—CH$_2$—CH$_2$—
 NH—OC—CH=CH—COONa Ⓢ

100 parts of wool are entered into the bath at 40°, which is then raised to 80° and held at this temperature for 45 minutes. The bath is well exhausted. The navy blue dyeing has a fully developed shade and has the normal fastness properties of the dye used, whereas when it is dyed in the absence of the aforestated assistant only a poorly developed dyeing of low depth is obtained.

EXAMPLE 3

A dyebath is prepared with 3000 parts of water, 0.2 part of the 1:2 chromium complex compound of 1-(2'-hydroxyphenylazo)-2-hydroxynaphthalene - 5' - sulfonic acid-(2''-hydroxyethylamide), 2 parts of 100% acetic acid and 9 parts of compound Ⓑ. 100 parts of a polyamide 66 fabric which normally dyes barry are entered into the bath at 20°. The temperature is increased to 98° in 40 minutes and this temperature is held for 20 minutes, on which the bath is exhausted. The dyed fabric is removed, rinsed with water and dried. A level violet dyeing free from barriness is obtained. Without the addition of the aforementioned compound the affinity differences in the polyamide material show up clearly as barriness.

The compound Ⓑ can be replaced by an equivalent amount of compound Ⓐ with the same good results.

The dye used in this example can be replaced by the same amount of one of the 1:2 metal complex dyes enumerated in Example 1 or by the dye C.I. Acid Red 111 used in Example 1.

EXAMPLE 4

A blend fabric containing 50 parts of wool and 50 parts of polyamide 66 fiber is entered into a dyebath at 20° consisting of 4000 parts of water, 0.2 part of the dye used in Example 3, 2 parts of 100% acetic acid and 2 parts of compound Ⓑ.

The bath is raised to 98–100° in 40 minutes and held at this temperature for 20 minutes. After this time the dyebath is exhausted. The blend fabric is removed from the bath, rinsed and dried. A violet dyeing is obtained which shows good solidity of shade on the two components of the blend and better fastness properties than are shown by a dyeing produced without the addition of compound Ⓑ.

The dye used in this example can be replaced by one of the red, grey or olive green 1:2 metal complex dyes mentioned in Example 1 with comparably good results.

EXAMPLE 5

A dyebath is prepared with 3000 parts of water, 0.25 part of the blue dye of formula

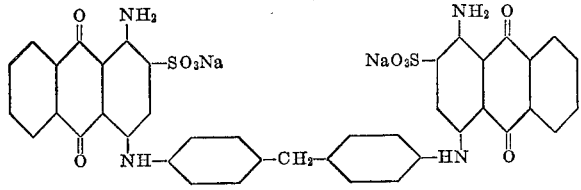

0.25 part of the red dye of the formula given in the first paragraph of Example 1, 2 parts of 100% acetic acid and 6 parts of compound Ⓑ. 100 parts of wool fabric containing wool fibers having different affinity for dyes are entered into the bath at 40°. The temperature is increased to 70° in 30 minutes and this temperature is held for 20 minutes, after which it is increased to 98–100° and dyeing continued for 15 minutes at this temperature. The bath is then exhausted. The dyed wool fabric is removed, rinsed and dried. A fast and level violet dyeing is obtained, whereas without the addition of compound Ⓑ the resulting dyeing is unserviceable since some of the fibers are dyed red while the others are blue.

When the red dye used in this example is replaced by 0.2 part of the 1:2 chromium complex compound of 1-phenyl - 3 - methyl - 4- ( 2''-hydroxy-3''-nitro-5''-chlorophenylazo) - 5-pyrazolone-4'-sulfonic acid-methylamide, 2.5 parts of compound Ⓑ are sufficient to obtain a level dyeing.

Having thus disclosed the invention, what I claim is:

1. In a process for dyeing polyamide fiber in a dyebath with anionic dye by an exhaustion method, the improvement which comprises treating the polyamide fiber in the dyebath within a temperature range from 40° to 100° C. in the presence of acetic acid with from 0.5 to 5 parts by weight per 1000 parts of said dyebath of a compound of the formula $$A_1-NH-CO-CH=CH-COOH$$

wherein $A_1$ is an alkyl radical with 8 to 12 carbon atoms or an alkoxypropyl radical containing a total of from 8 to 12 carbon atoms.

2. A process according to claim 1 wherein the compound is of the formula $$n\text{-octyl}-NH-CO-CH=CH-COOH$$

3. A process according to claim 1 wherein the compound is of the formula $$2\text{-ethyl-n-hexyl}-O-CH_2-CH_2-CH_2-NH-CO-CH=CH-COOH$$

4. A process according to claim 1 wherein the polyamide fiber is wool.

5. A process according to claim 1 wherein the polyamide fiber is synthetic polyamide fiber.

References Cited

UNITED STATES PATENTS 3,294,477  12/1966  Tamer _____ 8—55
3,362,780  1/1968   Kuth _____ 8—87

NORMAN G. TORCHIN, Primary Examiner

J. E. CALLAGHAN, Assistant Examiner

U.S. Cl. X.R.

8—55, 87